Oct. 23, 1962     F. H. NORAS     3,059,378

TREE PADS

Filed May 5, 1960

INVENTOR.
FRANK H. NORAS

BY

Bean, Brooks, Buckley & Bean
ATTORNEYS

3,059,378
TREE PADS
Frank H. Noras, 861 Ransom Road, Grand Island, N.Y.
Filed May 5, 1960, Ser. No. 27,111
1 Claim. (Cl. 47—25)

The invention relates in general to tree pads, and in particular to a porous border disc for trees, shrubs, and the like.

It is known to those skilled in the art that it is difficult and well nigh impossible to mow grass around a tree, shrub or other rigid object without injuring the tree with the mower, thus requiring that the grass be hand trimmed in order to present a desirable appearance around the tree.

It is the principal object of my invention to provide a two-part tree pad which may be placed around the base of a tree to prevent the growth of grass therearound and to facilitate the mowing of grass in close proximity to the pad.

Another object is to provide a two-part pad, each section being secured to the other section by means of staples inserted through the sections and made to penetrate the ground beneath the pad, each of the staples being provided with locking means to snap into position thereby releasably holding the parts in locked positions.

A further object is to provide a pad having an outer periphery and an inner aperture which are inclined on their edges so that when the top surface of the pad is at ground level, the pad will be anchored by the soil.

Another object is to provide a tree pad made of material having substantially the same absorbent factor as the average garden soil but a moisture retentive factor of about 50% greater than the soil.

Moreover, the use of my device eliminates the necessity of cultivation around the tree, shrub, or the like.

Another object is to provide a pad which is substantially permanent and one which will not wear out or deteriorate but which can be left in position the year around, except when removal is necessary due to the growth of the plant or tree.

Another object is to provide a tree pad having sufficient weight to hold it in place when once it is imbedded in the ground.

Moreover, the pad is provided with a depressed central portion which will collect and carry excess moisture to the center where it will be deposited upon the root of the tree.

Furthermore, my pad is made of a semi-dry concrete mix which is tamped into a mold, whereby it remains porous to moisture, and because of its porosity the pad may be decorated by colored liquids.

The above objects and advantages have been accomplished by the device shown in the accompanying drawings, of which:

Figure 1:
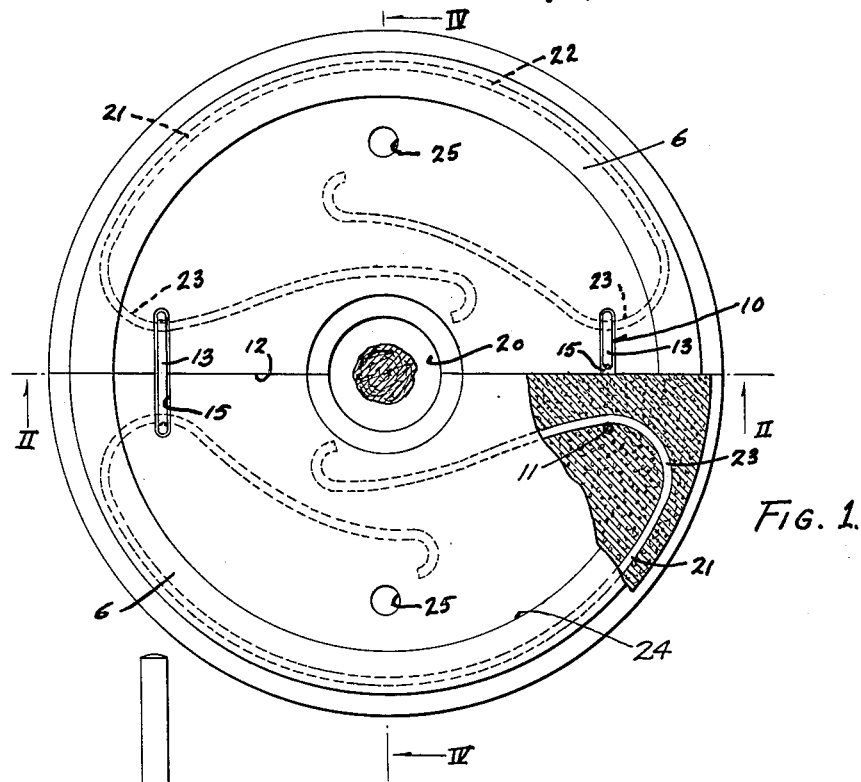
FIG. 1 is a plan view of my invention.
Figure 2:
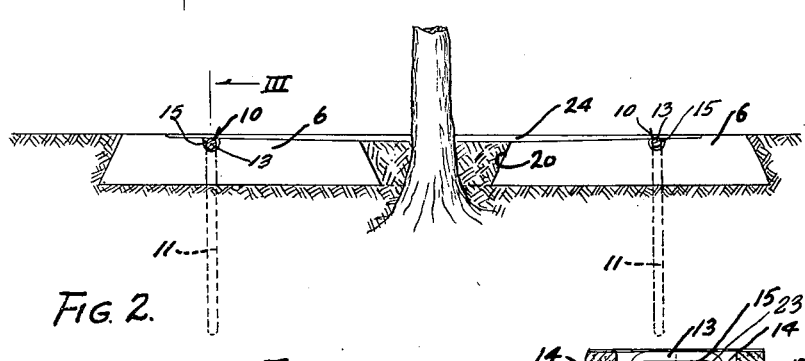
FIG. 2 is a side elevation of one of the pad sections viewed from the joint therebetween on line II—II of FIG. 1.
Figures 3, 4:
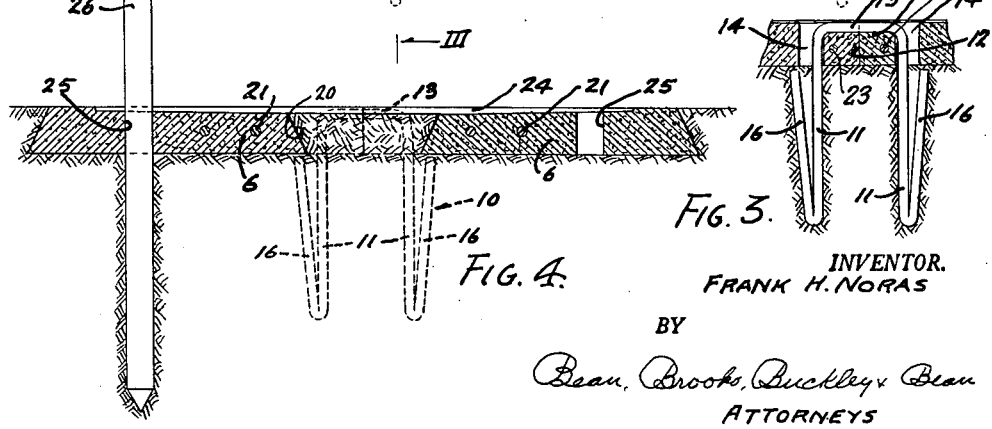
FIG. 3 is a fragmentary sectional elevation of the pad taken along line III—III of FIG. 2; and, FIG. 4 is a sectional elevation of the device taken on line IV—IV of FIG. 1.

My device comprises a substantially flat pad 5 in the form of a disc preferably of circular shape or of any desired polygonal shape. The pad is formed of two or more complementary parts 6 held together in assembled positions by the use of staples 10. Each staple is provided with two legs 11 which straddles the joint 12 between the parts 6 of the pad and which are joined together by means of a horizontal member 13. Apertures 14 are formed through the pads at each side of the joint therebetween for the reception of the legs 11 of the staples, and a groove 15 is formed in the top of the pad parts and joins the leg apertures 14 of each staple. Each staple leg 11 is formed at its lower end with a locking portion 16 which normally extends upwardly and outwardly so that when the legs are inserted through the leg apertures 14 the lock portions will be sprung inwardly towards the adjacent leg and will snap outwardly when the upper end of the lock portion has been pushed downwardly below the lower surface of the pad, thus securely locking the staples in place.

The pad is formed with a central aperture 20 for the accommodation of the tree or other object which it is to surround, and the peripheral edges of the pad and the aperture 20 are inclined, whereby when imbedded in the soil to the level thereof the pad will be held in place.

The material used in the pad is preferably porous and has a moisture absorbent factor of about the same as that of the average garden soil and I have found that a semi-dry concrete mix is very suitable for this purpose. The ingredients of such a mix are the usual proportions of sand and cement as would be suitable for a regular poured cement mixture but having only sufficient water to hold the mixture together when tamped in a mold. Such a mixture readily absorbs moisture and has a moisture retentive factor of approximately 50% greater than the average garden soil, thus keeping the trees or shrubs supplied with moisture for a protracted period.

Each part 6 of the pad is provided with a reinforcing wire 21 which, as shown in FIG. 1, is imbedded in the body of the pad. The portion 22 of the reinforcing wire is preferably concentric with the periphery of the pad and the portions 23 are curved inwardly in bent formation and are so located that they will be disposed just beyond the staple leg 11 so that when the parts are in assembled positions and the staples have been put in place, the adjacent leg will be substantially engaged with the portion 23 of the reinforcing wire and serve to strengthen the assembled parts.

The pad is formed with an annular depressed recess 24 extending from a point near the outer periphery of the pad and terminating at the central aperture 20. The surface of this depressed recess is inclined toward the central aperture whereby the moisture not absorbed by the pad will be collected in the recess and will run into the central opening, thereby increasing the moisture content of the soil under the pad.

A rod aperture 25 may be provided in each of the parts 6 of the pad for supporting a rod 26 which may be passed through the aperture 25 and into the soil for conveniently supporting a tree or shrub.

It will be obvious that when a tree or shrub has grown to such a size that it fills the central aperture 20, the parts of the pad may be removed and replaced by a pad of larger size.

While I have described the use of my device for trees or shrubs, obviously it may be used in connection with any article or fixture on a lawn, such as, a bird house support, children's swings, flag poles, driveway lights, or the like.

Having thus described my device, what I claim is:

A tree pad, comprising a substantially flat porous disc having multi-sections abutting each other to form a joint therebetween, said pad having its top surface disposed at soil level and being formed with a central opening, the earth-exposed edges of said pad being inclined outwardly from the upper surface thereof, the upper surface of said pad being formed with a depressed recess, staples for connecting said sections, each staple having downwardly extending legs and a horizontal portion joining said legs and disposed on top of said sections, each section of said pad containing wire reinforcing and being formed with leg apertures adjacent said joint and said reinforcing and with a horizontal groove joining said leg apertures, said legs being disposed in said leg apertures and said horizontal position being disposed in said groove and overlying said reinforcing, and means for locking said staples in place.

References Cited in the file of this patent

UNITED STATES PATENTS

| | | |
|---|---|---|
| 313,424 | Hughes | Mar. 3, 1885 |
| 1,319,769 | Hammond | Oct. 28, 1919 |
| 1,453,810 | Sleen | May 1, 1923 |
| 1,698,021 | Lovett | Jan. 8, 1929 |
| 2,109,576 | Place | Mar. 1, 1938 |

FOREIGN PATENTS

| | | |
|---|---|---|
| 266,726 | Great Britain | Sept. 15, 1927 |
| 296,501 | Italy | May 18, 1932 |